(12) United States Patent
Juranitch

(10) Patent No.: US 12,044,002 B2
(45) Date of Patent: Jul. 23, 2024

(54) HYBRID, HIGH-TEMPERATURE INSULATION PRODUCT, AND RELATED SYSTEM AND PROCESS

(71) Applicant: Axenic Power, LLC, Fort Lauderdale, FL (US)

(72) Inventor: James C. Juranitch, Fort Lauderdale, FL (US)

(73) Assignee: Heat IP Holdco, LLC, Aberdeen (GB)

( * ) Notice: Subject to any disclaimer, the term of this patent is extended or adjusted under 35 U.S.C. 154(b) by 361 days.

(21) Appl. No.: 15/112,174

(22) PCT Filed: Jan. 16, 2015

(86) PCT No.: PCT/US2015/011814
§ 371 (c)(1),
(2) Date: Jul. 16, 2016

(87) PCT Pub. No.: WO2015/109226
PCT Pub. Date: Jul. 23, 2015

(65) Prior Publication Data
US 2016/0333571 A1    Nov. 17, 2016

Related U.S. Application Data

(60) Provisional application No. 61/928,353, filed on Jan. 16, 2014.

(51) Int. Cl.
| | |
|---|---|
| *E04B 1/78* | (2006.01) |
| *C03B 3/02* | (2006.01) |
| *C03B 5/00* | (2006.01) |
| *C03B 5/02* | (2006.01) |
| *C03B 37/04* | (2006.01) |

(Continued)

(52) U.S. Cl.
CPC ............ *E04B 1/78* (2013.01); *C03B 3/023* (2013.01); *C03B 5/005* (2013.01); *C03B 5/021* (2013.01); *C03B 5/025* (2013.01); *C03B 37/04* (2013.01); *C03B 37/05* (2013.01); *C03B 37/16* (2013.01);
(Continued)

(58) Field of Classification Search
CPC ......... C03B 5/025; C03B 5/021; C03B 5/005; C03B 3/023; C03B 37/16; C03B 37/05; C03B 37/04; D10B 2101/06; D04H 1/4218; D04H 5/12; D04H 3/004; D06N 3/0022;
(Continued)

(56) References Cited

U.S. PATENT DOCUMENTS

| | | | |
|---|---|---|---|
| 4,167,604 A | 9/1979 | Aldrich | |
| 4,201,247 A * | 5/1980 | Shannon | .......... E04B 1/88 138/140 |

(Continued)

FOREIGN PATENT DOCUMENTS

| | | |
|---|---|---|
| EP | 0146840 A2 | 7/1985 |
| EP | 0406354 B2 | 8/2003 |

(Continued)

*Primary Examiner* — Elizabeth M Imani
(74) *Attorney, Agent, or Firm* — Dykema Gossett PLLC

(57) ABSTRACT

A hybrid insulation product, and a related system and method of producing the hybrid insulation product in a cost-effective manner are disclosed. The insulation product has superior insulating and flame-retarding properties when compared to fiberglass insulation. The product can be used in blown-in applications, batts production, and board production.

6 Claims, 3 Drawing Sheets

(51) Int. Cl.
  *C03B 37/05* (2006.01)
  *C03B 37/16* (2006.01)
  *E04B 1/76* (2006.01)
  *F16L 59/04* (2006.01)
(52) U.S. Cl.
  CPC ............... E04B 1/76 (2013.01); F16L 59/04 (2013.01); *E04B 1/7604* (2013.01)
(58) Field of Classification Search
  CPC .............. D06N 2201/082; C03C 13/06; Y10T 442/605; Y10T 442/687; Y10T 442/645
  USPC ........ 65/136.1; 442/331, 332, 348, 355, 410, 442/406
  See application file for complete search history.

(56) References Cited

U.S. PATENT DOCUMENTS

| | | | |
|---|---|---|---|
| 4,468,336 A | 8/1984 | Smith | |
| 4,992,327 A | 2/1991 | Donovan et al. | |
| 5,057,168 A | 10/1991 | Muncrief | |
| 5,389,716 A * | 2/1995 | Graves | C08L 57/08 524/492 |
| 5,431,992 A | 7/1995 | Hloupt et al. | |
| 5,624,742 A * | 4/1997 | Babbitt | C03B 37/04 19/145.5 |
| 2005/0279963 A1 | 12/2005 | Church et al. | |
| 2006/0163763 A1* | 7/2006 | Fellinger | E04B 1/7604 264/35 |
| 2008/0160857 A1 | 7/2008 | Chacko et al. | |
| 2012/0097405 A1* | 4/2012 | Cordts | A62C 2/06 169/45 |
| 2013/0248013 A1 | 9/2013 | Chakkalakal | |
| 2013/0326952 A1 | 12/2013 | Juranitch et al. | |
| 2014/0004766 A1* | 1/2014 | Forte | E04B 1/7662 442/414 |

FOREIGN PATENT DOCUMENTS

| | | |
|---|---|---|
| EP | 1475224 A1 | 11/2004 |
| WO | 0065139 A1 | 11/2000 |

* cited by examiner

*300*

HYBRID, HIGH-TEMPERATURE INSULATION PRODUCT, AND RELATED SYSTEM AND PROCESS

This application is a 371 of PCT/US15/11814 filed Jan. 16, 2015.

BACKGROUND OF THE INVENTION

1. Field of the Invention

This invention relates generally to a high-temperature flame retardant, cost effective, insulation product and related process.

2. Description of the Related Art

The fiber industry is a mature business. Man has been collecting, manufacturing and blending fibers for thousands of years. Much existing art can be compared. In the field of insulating fibers which are used in dwelling construction, the market is sharply focused. Again, much work has been done in this specific area. Much previous art has been filed. In the end, the customer, as always, drives the product evolution.

In the USA the consumer and commercial insulation market is driven by price. Quality takes a distant back seat to price. Europe, Russia, and Asia are more driven by product attributes and overall quality. For that reason, stone wool, slag wool, and other high-temperature insulation products have never sold in any great quantities in the USA. In contrast, in Europe, Russia, and Asia, these insulation materials are the predominant insulation products primarily due to their superior features and benefits. These are superior insulation products in many ways including the following:

- The fibers are flame retardant and capable of enduring temperatures twice as hot as fiberglass insulation. This is key to an occupant's safety in a fire. It may in many cases even prevent a fire from happening. The dynamics of a house fire make the penetration of a flame through a wall or more importantly through a ceiling to the truss area in a house a key issue. Once the flames and heat penetrate the ceiling area into the typical wooden truss construction found in the USA, the heat and flames find an ideal plenum formed by the attic or open first floor ceiling beam space. The fire becomes very energetic at that point and engulfs the complete structure rapidly. Stopping this from occurring can be the difference between life and death for the residence.
- Fiberglass' insulating capabilities go down with temperature. In other words it doesn't work well when you really need it (much like a bank). Stone wool and other more dense high-temperature insulating fibers have better insulating qualities when ambient temperatures go down.
- Wind cuts through fiberglass insulation and can rearrange the product in an attic. Stone wool and other more dense high temperature insulating fibers resist the effects of wind.
- Fiberglass does not attenuate or reduce noise transfer to any great degree. Stone wool and other more dense high-temperature insulating fibers attenuate noise well.
- Fiberglass insulation is ruined when it gets wet. Stone wool and many other more dense high-temperature insulating fibers are not affected when they get wet.
- Fiberglass grows mold when wet. Stone wool, slag wool, and many other high-temperature fibers resists the growth of mold.

With all these positive attributes, one would wonder why stone wool, slag wool, and other high-temperature fibers have not sold well in the USA. The answer is simple. They cost too much. This invention solves that problem by inventing a hybrid, high-temperature, cost effective, insulating product and developing a cost effective process to manufacture the new and novel product.

Hybrid insulations have been developed in the past. An example of that is European patent application publication no. 0146840 A2 (application no. 84114765.5, claiming priority to US application serial no. 558,690) to Manville Service Corporation, with a filing date of Apr. 12, 1984 ('840 publication). This published patent application purports to teach "[a] hybrid blowing insulation comprising from 30 to 70% by weight fiber glass nodules blended with from 70 to 30% by weight cellulosic fiber, said cellulosic fiber having been treated with a flame retardant, said hybrid blowing insulation being smolder resistant when exposed to a hot plate having a temperature which exceeds 500° F. (260° C.) for a period of six hours." '840 publication, claim 1. This published patent application also purports to teach improved insulating product performance when confined to the narrow area of using fiberglass and cellulose in specific ratios. The temperature performance of the end product disclosed in the '840 Publication is, however, many times worse as a flame retardant than the advanced product and process taught herein. Also, the insulation product disclosed herein has no cellulose involved. The Manville patent application publication teaches nothing relating to cost effective, high-temperature (stone wool, slag wool, and other dense fibers that can survive temperatures over 1800 degrees F.) hybrid fibers, and insulation products or production of such insulation products.

U.S. Pat. No. 7,449,125 B2, assigned to Guardian Fiberglass, Inc., issued Nov. 11, 2008, is another patent which purportedly teaches mixing cellulose with fiberglass. Specifically, it ostensibly teaches a "Loose-fill insulation mixture consisting essentially of from about 15-60% cellulose and from about 40-85% fiberglass; and wherein the loose-fill insulation has an R-value/inch of at least about 2.4 when blown dry into and/or onto an area including a flat support surface." '125 patent, claim 1. Again, this patent relates to specific cellulose and fiberglass mixes; and, again, the temperature performance of the end product is many times worse than the advanced product and process taught herein. The '125 patent teaches nothing relating to cost effective, high-temperature (stone wool, slag wool, and other dense fibers that can survive temperatures over 1800 degrees F.) hybrid fibers, and insulation products or production of such insulation products.

International publication no. WO 00/65139 A1, filed Apr. 27, 2000, purportedly teaches "A blowable insulation material comprising one or more of the materials from the group consisting of batt, web, a portion of batt, and a portion of web shredded into blowable clusters." '139 publication, claim 1. The stated goal in this publication is to make a low cost, down-like material primarily for cloths. It teaches nothing related to high-temperature capability insulation product or high temperature fiber hybrids.

In U.S. Pat. No. 5,624,742, filed Mar. 20, 1996, and assigned to Owens-Corning Fiberglas Technology Inc. purportedly teaches "A loose-fill insulation product comprising a blend of a first insulating material comprised of a first series of three-dimensional groups of fiber having first size and density and a second series of three-dimensional groups of fibers having second size and density, said second size being smaller than said first size; wherein the fibers of at least one of said first or second insulating materials are irregularly-shaped glass fibers wherein each fiber is comprised of two distinct glass compositions with different coefficients of thermal expansion." '742 patent, claim 1. The insulation product described herein has no involvement with glass fibers wherein each fiber is comprised of two distinct glass compositions with different coefficients of thermal expansion.

U.S. Pat. No. 4,167,604 to Aldrich ostensibly teaches a hybrid fiber that is "A thermal insulation material comprising a batting, said batting being formed from a carded web containing at least 10 wt. % natural down and a synthetic fiber staple, said synthetic fiber staple being formed from crimped, hollow polyester fibers." '604 patent, claim 1. By comparison, the insulation product described herein uses no down or crimped, hollow polyester fibers. The insulation product described herein also has significantly higher temperature performance.

U.S. Pat. No. 4,468,336 to Smith describes a blown loose fill hybrid insulation and purportedly teaches "A loose fill insulation for use as a low settled density heat insulator in a building structure comprising a mixture of loose fill cellulosic insulation and staple fibers from a group of fibers consisting of polypropylene, acetate, acrylic, vinyl, polyethylene, and polyester." '336 patent, claim 1. In contrast, the insulation product described herein has no involvement with a mixture of loose fill cellulosic insulation and staple fibers from a group of fibers consisting of polypropylene, acetate, acrylic, vinyl, polyethylene, and polyester. The insulation product described herein also has significantly higher temperature performance.

U.S. Pat. No. 5,057,168 to Muncrief purportedly teaches a process of blending natural fibers and synthetic fibers with a binder and processing a batt hybrid at a temperature that is above the melting temperature of one of the fibers to form a specific web that is turned into a batt in a very specific and detailed process. In contrast, the insulation product described herein does not require binder or use any fibers in a process above their melting temperature to form a web or batt.

U.S. Pat. No. 5,431,992 to Houpt et al. purportedly teaches an insulating product that is: "A glass fiber insulation product comprising irregularly-shaped glass fibers having a substantially uniform volume filling nature, wherein the irregularly-shaped glass fibers comprise two distinct glass compositions with different coefficients of thermal expansion." '992 patent, claim 1. By comparison the invention described herein does not use two distinct glass compositions to make up any of its fibers with different coefficients of thermal expansion in its execution to construct these fibers.

U.S. Pat. No. 4,992,327 to Donovan et al. purportedly teaches a hybrid insulator comprised of "A synthetic fiber thermal insulator material in the form of a cohesive fiber structure, which structure comprises an assemblage of:
"(a) from 70 to 95 weight percent of spun and drawn, synthetic polymeric microfibers having a diameter of from 3 to 12 microns; and
"(b) from 5 to 30 weight percent of synthetic polymeric macrofibers having a diameter of 12 to 50 microns . . . "
'327 patent, claim 1. In contrast, the insulation product described herein does not use polymeric fibers or any microfibers having a diameter of 12 to 50 microns.

US patent application publication no. 2013/0248013 A1, published on Sep. 26, 2013, to Chakkalakal purportedly teaches "A hybrid insulation system comprising:

a) a pipeline having a hollow interior configuration to fluidly carry a material and at least one heating element carried by an outer surface of the pipeline;
b) a first insulation layer, the first insulation layer comprising:
 i. a first insulation portion carried along a first peripheral portion of the outer surface of the pipeline, wherein the first insulation portion is arranged substantially opposite from the at least one heating element carried by the outer surface;
 ii. a second insulation portion carried along a second peripheral portion to the outer surface of the pipeline;
c) a second insulation layer . . . "
'013 publication, claim 1. It can be seen from the above text that Chakkalakal teaches a hybrid made up of insulation layers specifically designed for a heated pipe. By comparison, the insulation product described herein comprises fiber mixes that do not rely on component layers of insulation or pipe applications.

European patent no. EP 0 406 354 B2 to Felegi et al. and assigned to Armstrong World Industries, Inc., purportedly teaches a composite board with specific mineral wool and other components then coated with binder to reduce board sag. By comparison, the insulation product disclosed herein teaches a high-temperature fiber product that relates to a hybrid fiber mix. It has no involvement with binders or narrow composite board recipes.

European patent application publication no. EP 1 475 224 A1 to Vaccari and assigned to Eurofiber S.p.A. relates to a hybrid mineral wool blanket used for insulating ovens and more specifically; "A mineral wool product for insulating ovens, characterized by comprising a blanket (2) with its fibers bound together without organic size, and a glass fabric (4) joined to at least one face of said blanket (2) by an inorganic binder." '224 publication, claim 1. Conversely, the insulation product described herein is not concerned with hybrid blankets glued together with binders. Rather, the present disclosure teaches a hybrid mix at a fiber level primarily for blown in dwelling insulation applications.

US patent application publication no. 2012/0097405 A1 to Cordts et al., filed on Oct. 26, 2010 and assigned to 3M Innovative Properties, purportedly describes a firestopping plug made up of a mix of stone wool and fiberglass and more specifically "A method of firestopping a through-penetration, comprising: providing a fusible inorganic blended-fiber web at least partially within the through-penetration, wherein the through-penetration does not comprise a firestop sealant." '405 publication, claim 1. Conversely, the insulation product described herein does not have intended applications to through-penetration firestopping. Rather, the insulation product that is the subject of the present disclosure is primarily a dwelling insulation product, such as a blown-in insulation product.

SUMMARY OF THE INVENTION

Embodiments of a high-temperature insulation product (e.g., a hybrid stone wool insulation product) and a process for making same are disclosed herein. In one embodiment, the process begins with the production of stone wool or another high-temperature or different aspect ratio fiber. The stone wool product and other high-temperature fiber products (e.g., slag wool) have in the past been produced using primarily coke fueled cupolas. In some cases in Russia these products are now being produced using natural gas ovens. In either case this method of production is expensive due to the involved energy costs. It is not required for this process, but highly desirable, to produce the high-temperature fiber products or conventional lower-temperature fiberglass fiber using a renewable energy process such as the one developed by Plasma Power, LLC (Ft. Lauderdale, Florida) using thermal plasma technology. In an embodiment, the stone wool or fiberglass is produced using the waste energy from biomass, garbage, drill tailings, and other forms of energy that might otherwise be wasted. This helps to defray the production costs of the stone wool or fiberglass. In many cases the production plant is paid to use the waste energy source it employs.

As part of the production process according to an embodiment, a low-density, conventional fiberglass insulation product is produced using, for example, a conventional HERM process familiar to those schooled in the art, or it can be produced using an air-blown or spinner wheel process. Some or all of the melting duties comprising part of the process according to this embodiment can be employed using the renewable energy plasma melting system taught herein. Multiple desirable hybrid traits are possible in this final product. A ratio of high-temperature fiber to conventional lower-temperature fiberglass fiber will improve the thermal characteristics and flame attenuation for the hybrid. The process according to this embodiment produces a hybrid final product comprising high-temperature fiber and fiberglass fiber in a ratio from about 5% to about 95% by weight. In yet another embodiment, the process employs different-aspect-ratio fibers, including, for example, fiberglass fiber of considerably different aspect ratio to the stone wool or other high-temperature fiber. The fiberglass fiber length and diameter should be, for example, physically different from and preferably smaller than the stone wool fibers. These physical differences increase the hybrid's insulating characteristics (R value). An ideal aspect ratio difference can be $\frac{1}{8}$ to $\frac{1}{2}$ the width and up to $\frac{1}{20}$ the length of the stone wool or other high temperature fiber. In actuality, a wide range of aspect ratio variability will work. A ratio of $\frac{1}{3}$ the width and $\frac{1}{10}$ the length is just one of many examples of hybrid fiber product that perform well in actual testing.

In another embodiment, the insulation product is a hybrid product, comprising a non-homogenous mix of the two products with different aspect ratios if an increased R is desired. The goal of allowing trapped air to enhance the hybrid's insulating performance is accomplished via the bridging of the different physical fibers and the resultant inability of the fibers to combine due to their inherent different aspect ratios. Prior art has attempted to accomplish the same goal using a more complex twisted fiber manufacturing processes. These prior art process used different glass compounds to induce thermal stresses into the fibers and twist them to form bridges in the mix. The technology taught herein is significantly easier and cheaper to implement in production. The stone wool or other high-temperature fiber in the hybrid is a known fire retardant. In a typical house fire, if this hybrid is used as blown-in insulation in an attic, the fiberglass in the hybrid will melt away quickly and the remaining stone wool component will leave behind a barrier to slow the fire or stop the fire from penetrating to the truss area or joist area and engulfing the complete house. This hybrid insulation product can be used to produce bat, board, blown-in product, and other known insulating systems.

To produce the hybrid product requires forcing two dissimilar fibers to combine in an ideal embodiment of this invention in a non-homogenous fashion to form the final hybrid product. This is a bit of a challenge. Very aggressive mixing systems have to be employed. A mill cutting system as shown herein is one of many successful mixing systems that can be employed. The hybrid product when produced as taught herein is an insulation product that has most of the desirable attributes of stone wool and other high-temperature insulating products while being produced at or below current fiberglass prices. As observed in much of the above prior art, mixing non-homogeneous components together augments some attributes, such as insulating capability, of the hybrid product. In the aspect ratio example given above the insulating capability (R value) of the hybrid is higher than either of the components used in the mix when used separately. In another embodiment fibers of different aspect ratios and different fire retardant capabilities are formed using the above described process into a high-quality hybrid insulation product having the added advantages of low cost, high R value, and advantageous flame retarding capabilities.

BRIEF DESCRIPTION OF THE DRAWING

Comprehension of the invention is facilitated by reading the following detailed description, in conjunction with the annexed drawing, in which.

DETAILED DESCRIPTION

Figure 1:
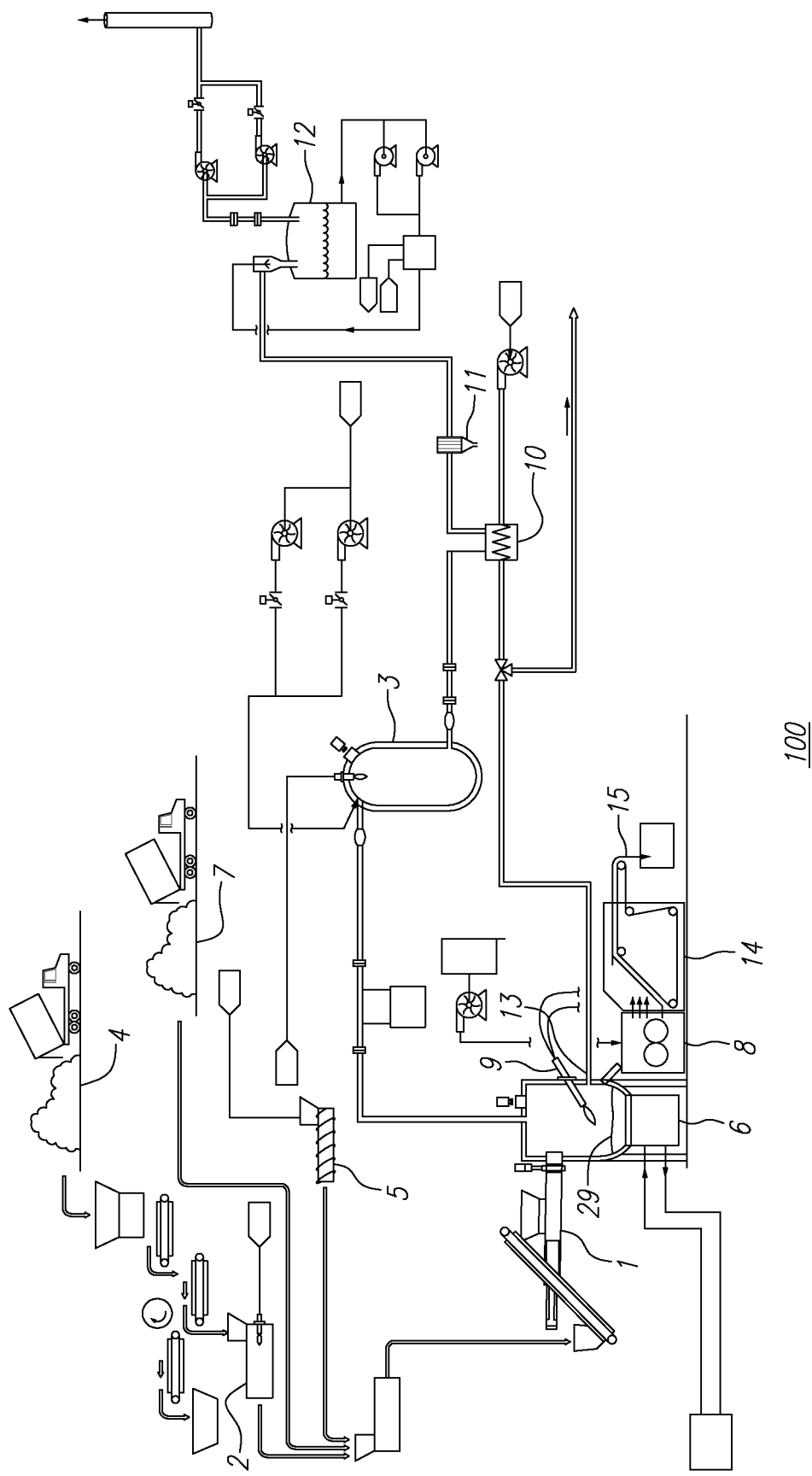
FIG. 1 is a simplified, schematic representation of the overall fiber production process.

FIG. 1 is a simplified, schematic representation of an embodiment of an overall system 100 for producing a hybrid, high-temperature insulation product comprising different fibers, constructed in accordance with an embodiment of the invention. As shown in this figure, the main feed tube 1 is the input for feedstock into the plasma chamber. The feedstock is preheated by a heat transfer system 2 to increase efficiency, with the heat transfer system 2 operating on waste, low-pressure steam heat generated from sensible heat or direct air or oil heating systems, which is recovered in the inductive/plasma process in this example from a syngas quench system 12 and/or through heat exchanger 10. More exotic heat transfer medias like molten salt can also be used. Two or more stages of heat recovery and preheating can be used. Municipal solid waste (MSW) and/or biomass 4 is shown as a feedstock in this process example. Other feedstocks can include typical fiber additives 5. These additives, such as lime, for example, can enhance the acid or base ratio of the fiber and can therefor make the fiber more durable or fragile to make it easier for the human body to break down the product if ingested. Additives such as aluminum oxide, for example, can enhance flame retarding capabilities of the fibers. A silicon source, such as recovered glass 7, can also be feedstock. Inductive coils (not shown) in induction furnace 6 and plasma torch 9 are the primary energy sources or inputs that react with the MSW or biomass 4 to produce Syngas (not shown), which is oxidized by air or oxygen jet 13 to release chemical renewable energy into the system. Inductive coils in induction furnace 6 and plasma torch or torches 9 react against a molten metal bath 29 to induce a stable production process temperature. The molten metal bath 29 is implemented to control the liquid molten fiber feedstock very consistently. This added consistency helps to produce a high quality fiber with consistent characteristics.

Afterburner 3, filter 11, and quench system 12 are portions of the emission reduction system. Sorbents can also be used and injected but have been left out for the sake of simplicity.

Stone wool or other high-temperature fibers are typically produced on a conventional spinner or centrifuge 8, collected in collection chamber 14, and deposited into the continuing production process at outlet 15. A conventional HERM or blowing process (not shown) can be substituted for the centrifuge 8 to produce a fiberglass of significantly different aspect ratio fiber than the high-temperature fiber that is produced typically from spinner 8. Spray additives for the high-temperature fiber or fiberglass product can be added in the collection chamber 14, trammel 21 (see FIG. 2), or other areas. These additives can be anti-static additives, dust reducing additives, fiber lubricants, and hydrophobic coatings such as silicone to enhance the fiber products usefulness.

Figure 2:
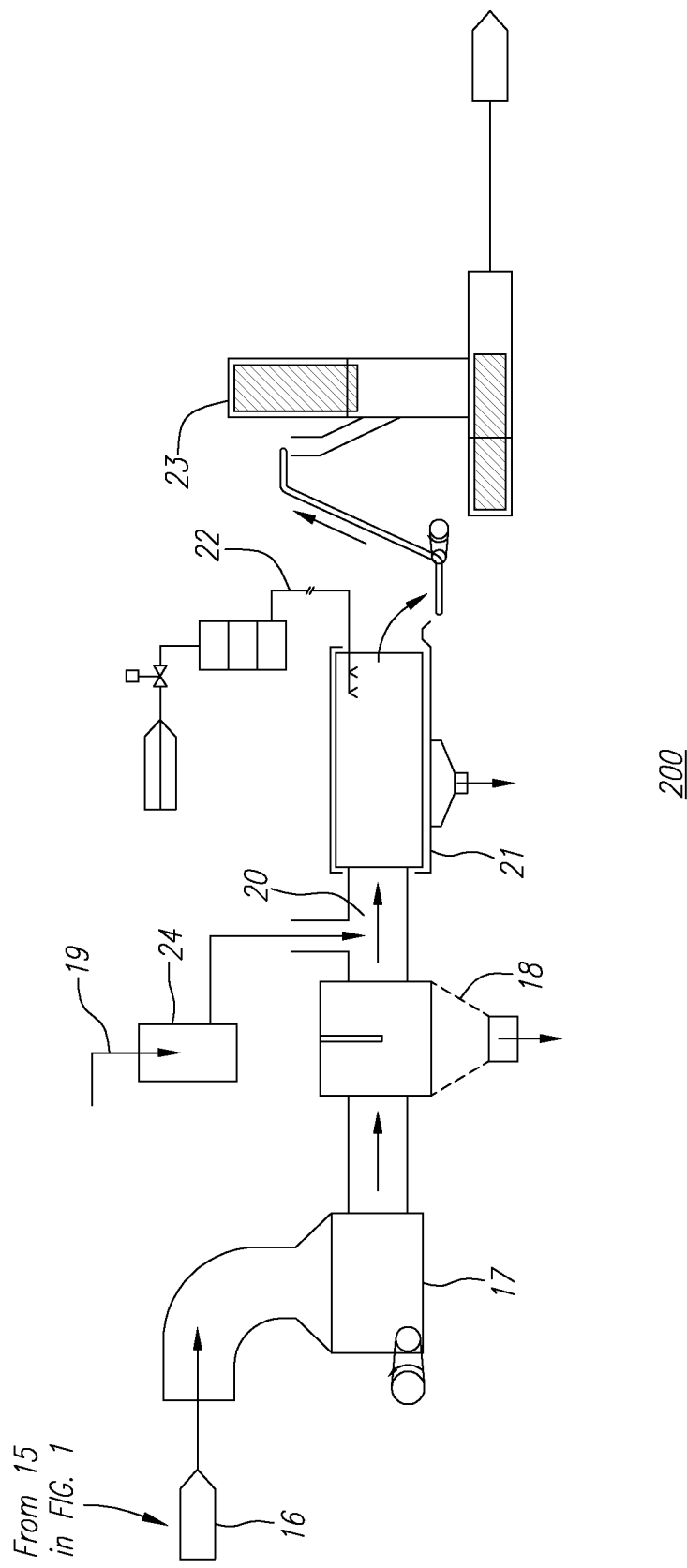
FIG. 2 is an example of a hybrid mixing process.

FIG. 2 shows an embodiment of a production process 200 for the continued manufacturing of the hybrid, high-temperature insulation product. Fiber from outlet 15 is fed into the inlet 16 of cutter 17. If the fiberglass is manufactured using a HERM or high-velocity, air-blown system, it will typically not be subjected to this process since its aspect ratio will already be significantly smaller than a milled or cut spun high-temperature fiber. Fiberglass product will instead be fed to buffer location 19. Longer, high-temperature stone wool or other high-temperature fibers will typically, but not always, be cut or milled in cutter 17 to yield specific product qualities. In a blown insulating product, densities can be controlled by the starting size and aspect ratio of the high-temperature fiber. Flame retardant characteristics are also affected by the fibers physical size. With a spun fiber, shot is removed in a large shot separation unit 18 and the high-velocity, high-temperature fiber is mixed with fiberglass at desired ratios at point 20. The hybrid can be continued to be mixed and cleaned in trommel/mixer 21. The wide ratios of hybrid mixes possible net specific characteristics. The ratio of high-temperature fiber to fiberglass can be 5% to 95% by weight depending on physical attributes, such as the fibers' chemistry and ability to withstand high temperature, or the aspect ratios of the fibers and the desired attributes (e.g., blown density) of the final product. Emulsion sprays 22 or other additives noted above can be added to the hybrid to enhance its performance. The final product is bagged or bailed in bagger/bailer 23 and then shipped.

Figure 3A:
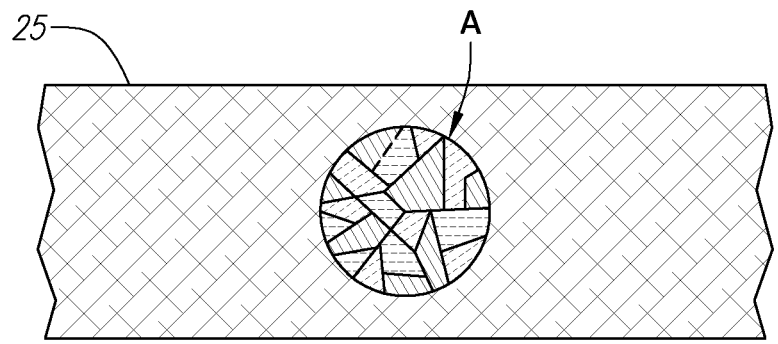
FIG. 3A is an example of the finished hybrid product.
Figure 3B:
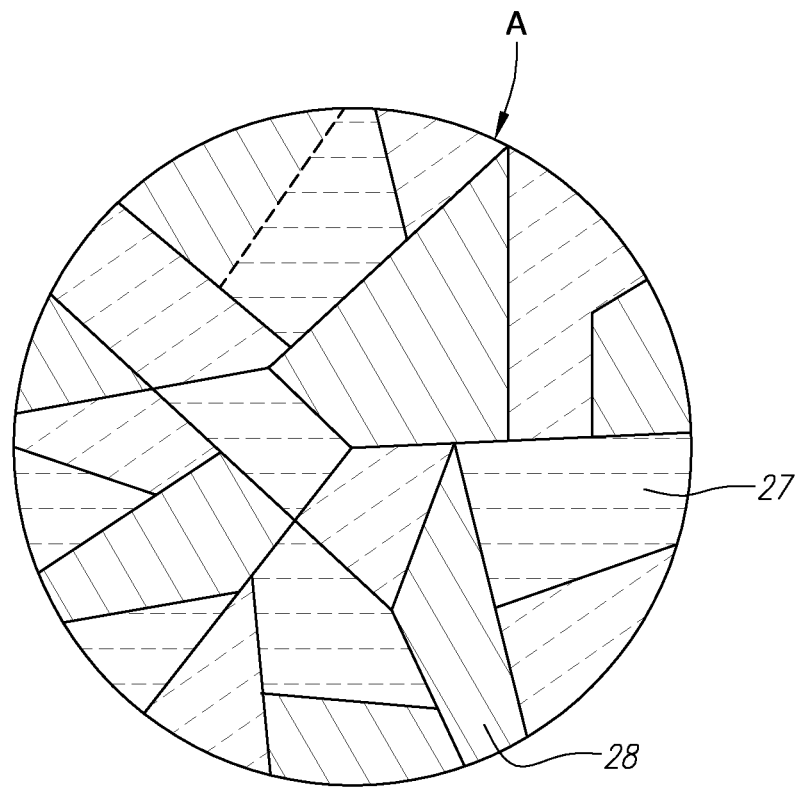
FIG. 3B is a blown-up view of a subset of the finished hybrid product.

FIG. 3A shows a side view of a blown insulation hybrid 25. Area A, which is an example of a subset of the blown insulation hybrid 25, shows a non-homogeneous blend of large, high-temperature fibers 28 and small, fiberglass fibers 27. FIG. 3B is a blown-up view of area A. The aspect ratios shown in area A can be reversed to produce high-density, blown product to be used in special flame retardant applications, but area A shows a typical product designed for today's larger-volume residential markets where low product cost is of primary concern and flame retardant characteristics are secondary.

All publications, patents, and patent applications cited above are incorporated by reference herein as though fully set forth.

It will be apparent to those skilled in the art that many modifications and equivalents thereof may be made without departing from the spirit and scope of the invention.

What is claimed is:

1. A hybrid insulation product comprising:
    a non-homogeneous mix of fibers resistant to high temperatures and fiberglass fibers;
        wherein the hybrid insulation product has flame retarding characteristics;
        wherein the fibers resistant to high temperatures have a first length and the fiberglass fibers have a second length;
        wherein the first length is more than four times greater than the second length;
        wherein the fibers resistant to high temperatures have a first width and the fiberglass fibers have a second width;
        wherein the second width is at most ½ of the first width;
        wherein the non-homogeneous fibers and trapped air within the non-homogeneous fibers enhance the insulating capability (R value) of the non-homogeneous mix of fibers to be greater than the R value of both the fibers resistant to high temperatures and the fiberglass fibers alone, and
        wherein the product is binder free and configured to be installed with a blown-in application as a binder free insulation product.

2. The product of claim 1, wherein the fibers resistant to high temperatures are stone wool fibers.

3. The product of claim 1, wherein the fibers resistant to high temperatures are slag wool fibers.

4. The product of claim 1, wherein the fibers resistant to high temperatures comprise about 5% to about 95% of the weight of the product.

5. The product of claim 1, wherein the product is manufactured in a renewable process utilizing thermal plasma.

6. The product of claim 5, wherein the renewable process further utilizes a metal bath.

* * * * *